(12) United States Patent
Jang et al.

(10) Patent No.: US 7,227,105 B2
(45) Date of Patent: Jun. 5, 2007

(54) COOKING APPARATUS

(75) Inventors: Seong-deog Jang, Suwon-si (KR); Han-seong Kang, Suwon-si (KR); Yong-hyun Kwon, Suwon-si (KR); Chul Kim, Yongin-si (KR); Han-jun Sung, Suwon-si (KR); Dae-sung Han, Hwaseong-si (KR); Tae-euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/189,794

(22) Filed: Jul. 27, 2005

(65) Prior Publication Data

US 2006/0151467 A1 Jul. 13, 2006

(30) Foreign Application Priority Data

Jan. 13, 2005 (KR) ............... 10-2005-0003310

(51) Int. Cl.
*H05B 3/68* (2006.01)
(52) U.S. Cl. .............. 219/450.1; 219/455.11
(58) Field of Classification Search ......... 219/443.1, 219/450.1, 451.1, 452.11, 452.12; 99/422, 99/425, 444, 445, 447
See application file for complete search history.

(56) References Cited

U.S. PATENT DOCUMENTS 2,996,597 A * 8/1961 Persinger et al. .......... 219/474
3,587,555 A * 6/1971 Cerola ...................... 126/11
4,441,015 A * 4/1984 Eichelberger et al. ...... 219/411
4,862,795 A * 9/1989 Hawkins ................... 99/446
6,472,644 B1 10/2002 Wu

FOREIGN PATENT DOCUMENTS

| EP | 1444939 | 2/2006 |
|---|---|---|
| FR | 2711499 | 10/1993 |
| FR | 2827146 | 7/2001 |
| KR | 1996-11445 | 8/1996 |
| KR | 1998-14801 | 6/1998 |
| KR | 1020020016089 | * 3/2002 |

OTHER PUBLICATIONS

Korean Patent Abstract: Korean Patent Application Publication No. 2004-39155; Title: Cooking Device; Abstract Only.
European Search Report for corresponding Application No. 05112304.0-2313 dated Apr. 7, 2006.

* cited by examiner

*Primary Examiner*—Sang Y. Paik
(74) *Attorney, Agent, or Firm*—Staas & Halsey LLP

(57) ABSTRACT

A cooking apparatus which prevents a top casing thereof from being heated by heat transmitted from an electric heater. The cooking apparatus having a grill part to cook food thereon, and a electric heater to cook the food, includes a grill housing having a main casing including an opening part coupled with the grill part, providing the electric heater thereon, and a top casing coupled with an upper side circumferential area of the main casing with the center to the opening part, and the top casing including a plurality of top casing units separately provided.

13 Claims, 4 Drawing Sheets

COOKING APPARATUS

CROSS-REFERENCE TO RELATED APPLICATIONS

This application claims the benefit of Korean Patent Application No. 2005-0003310, filed on Jan. 13, 2005, in the Korean Intellectual Property Office, the disclosure of which is incorporated herein by reference.

BACKGROUND OF THE INVENTION

1. Field of the Invention

The present invention relates to a cooking apparatus, and more particularly, to a cooking apparatus that can prevent a top casing thereof from being heated by heat transmitted from an electric heater.

2. Description of the Related Art

Conventionally, "grilling" refers to a method of broiling meats, fishes or shellfishes, etc. on a gridiron or directly roasting skewered meats or fishes on the fire. A grill device as a kind of household electric appliance refers to a device to broil meats by using electricity or gas, etc.

Particularly, an electric grill device cooks food by using electric heaters as heating source to generate the heat by electric power. A main body of the electric grill device includes a grill part directly contacting and cooking food. The heat of the electric heaters is reflected to the grill part by a grill reflecting member and used when food is cooked.

A conventional grill device disclosed in Korean Patent First Publication No. 2004-39155 includes a main body, a plurality of heating members provided in a lower part of a top plate of the main body, for heating food, a grill member disposed in an upper part of the main body, for sitting food thereon, and a heat reflection member disposed in a lower part of the main body, for transmitting a radiant heat of the heating members to the grill member.

The conventional cooking device is not configured to prevent the top plate of the main body from receiving heat generated from the heat reflection member disposed at the lower part of the main body. That is, the conventional cooking device does not prevent the top plate part of the main body at which user can easily approach, from being heated by heat.

SUMMARY OF THE INVENTION

Accordingly, it is an aspect of the present invention to provide a cooking apparatus that can prevent a top casing thereof from being heated by heat transmitted from an electric heater.

Additional aspects and/or advantages of the invention will be set forth in part in the description which follows and, in part, will be apparent from the description, or may be learned by practice of the invention.

The foregoing and/or other aspects of the present invention are achieved by providing a cooking apparatus having a grill part to cook food thereon, and a electric heater to cook the food, the cooking apparatus includes a grill housing including a main casing having an opening part coupled with the grill part, the electric heater provided thereon, and a top casing coupled with an upper side circumferential area of the main casing with a center to the opening part, and the top casing including a plurality of top casing units separately provided from each other.

The main casing may include an inner casing providing electric heaters in an inner side thereof, and a outer casing disposed such that a predetermined space exist between the outer casing and the inner casing, and the top casing is coupled with an upper side of the inner casing and the outer casing to cover the predetermined space.

The top casing may include a first top casing unit coupled with an upper area of the outer casing and a second top casing unit being capable of separating from the first top casing unit, coupled with an upper area of the inner casing.

The top casing may include an insulation space forming an air layer between the first top casing unit and the second top casing unit.

The insulation space is formed by a predetermined distance between the first top casing unit and the second top casing unit may form the insulation space.

The first top casing unit may contact with the second top casing unit by a plurality of contact parts provided in the second top casing unit which are spaced along the circumference direction of the opening part of the main casing.

The first top casing unit may contact with the second top casing unit by a plurality of contact parts provided in the second top casing unit which are spaced along the circumference direction of the opening part of the main casing.

BRIEF DESCRIPTION OF THE DRAWINGS

These and other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
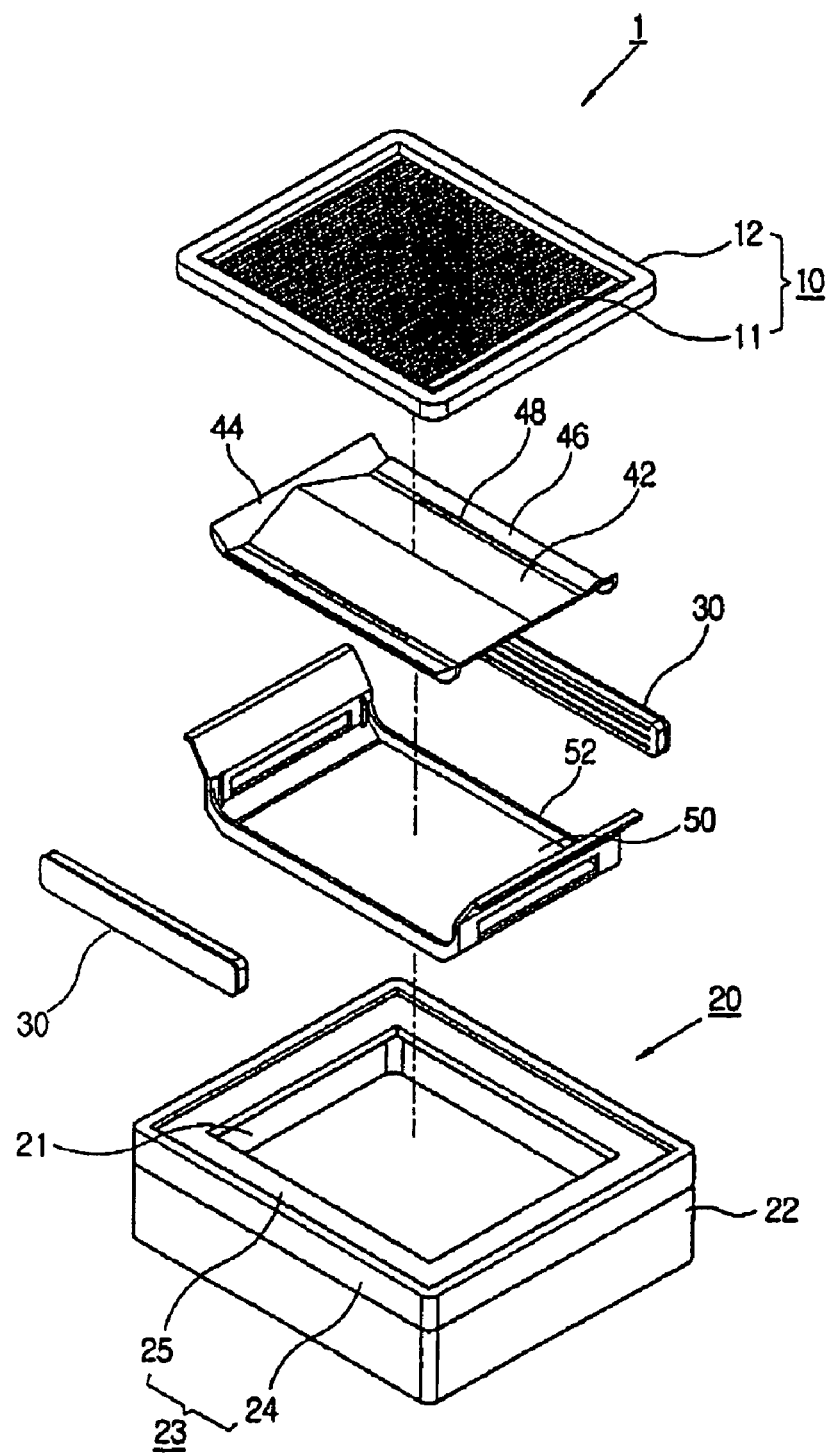
FIG. 1 is an exploded perspective view illustrating a cooking apparatus according to an embodiment of the present invention.

Reference will now be made in detail to the embodiments of the present invention, examples of which are illustrated in the accompanying drawings, wherein like reference numerals refer to like elements throughout. The embodiments are described below so as to explain the present invention by referring to the figures.

In FIG. 1, a cooking apparatus 1 according to the present invention comprises a grill part 10 on which food is cooked, a grill housing 20 coupled with a lower part of the grill part 10, receiving therein a variety of parts and accessories.

The grill part 10 directly contacting and cooking food is coupled with an upper part of the grill housing 20. The grill part 10 comprises a plurality of grill bars 11 disposed at predetermined intervals so as to make food safely seated thereon, and a support frame 12 supporting the plurality of grill bars 11 along the circumferential direction.

The grill housing 20 supports the lower part of the grill part 10 mounted on an upper opening part thereof, inside of which a heating space is formed. Inside the grill housing 20 are received electric heaters 30 formed in a pair as heating source, a grill reflecting member 40 (shown in FIG. 2) reflecting heat from the electric heaters 30, and an oil collector 50 for collecting oil in a lower part of the grill reflecting member 40. The oil collector 50 includes side wall parts 52 upwardly extended and coupled to bent side plate parts 49.

The grill housing 20 comprises a main casing 31 having a inner casing 21 forming a heating space inside the grill housing 20 and an outer casing 22 disposed such that a predetermined space exist between the inner casing 21 and the outer casing 22, to form the main casing 31, and a top casing 23 covering an upper area of the inner casing 21 and the outer casing 22. The top casing 23 may be made of metallic materials. However, the top casing 23 it is not limited thereto.

Two electric heaters 30 are installed oppositely to each other on side walls inside the grill housing 20 so that they are disposed in the lower part of the grill part 10. The heat generated in the electric heaters 30 is transmitted to the grill part 10 by the grill reflecting member 40.

The grill reflecting member 40 is of an approximately W-shaped section. The grill reflecting member 40 may be made of metallic materials having a good thermal conductivity so as to reflect the heat generated from the electric heaters 30 and then transmit it to the grill part 10. However, the grill reflecting member 40 is not limited thereto.

The grill reflecting member 40 comprises a pair of first reflection faces 42 interconnected at a center of the grill reflecting member 40, auxiliary reflection faces 46 formed oppositely to the first reflection faces 42, and a second reflection face 44 extended from ends of the first reflection faces 42 and the auxiliary reflection faces 46.

The first reflection faces 42 are disposed in a direction of emitting the heat from the electric heaters 30 (i.e., in front of the electric heaters 30) to thereby reflect the heat generated from the electric heaters 30 to the grill part 10 in a bent manner.

The auxiliary reflection faces 46 are adjacent to the electric heaters 30, for which their temperatures become high while the cooking apparatus 1 is in operation. On ends of the auxiliary reflection faces 46 are formed bent side plate parts 49 which are coupled with the side wall parts 52 of the oil collector 50.

An oil guiding hole 48 is formed between the auxiliary reflection faces 46 and the first reflection faces 42, which guides the oil from the food being cooked downward. Accordingly, the oil passing through the oil guiding hole 48 is collected in the oil collector 50 disposed in the lower part of the grill reflection member 40.

The second reflection face 44 is disposed laterally to a heat emitting direction of the electric heaters 30. The second reflection face 44 is smoothly curved so as to allow the heat generated from the electric heaters 30 to be reflected to the grill part 10 in a bent manner.

Figure 2:
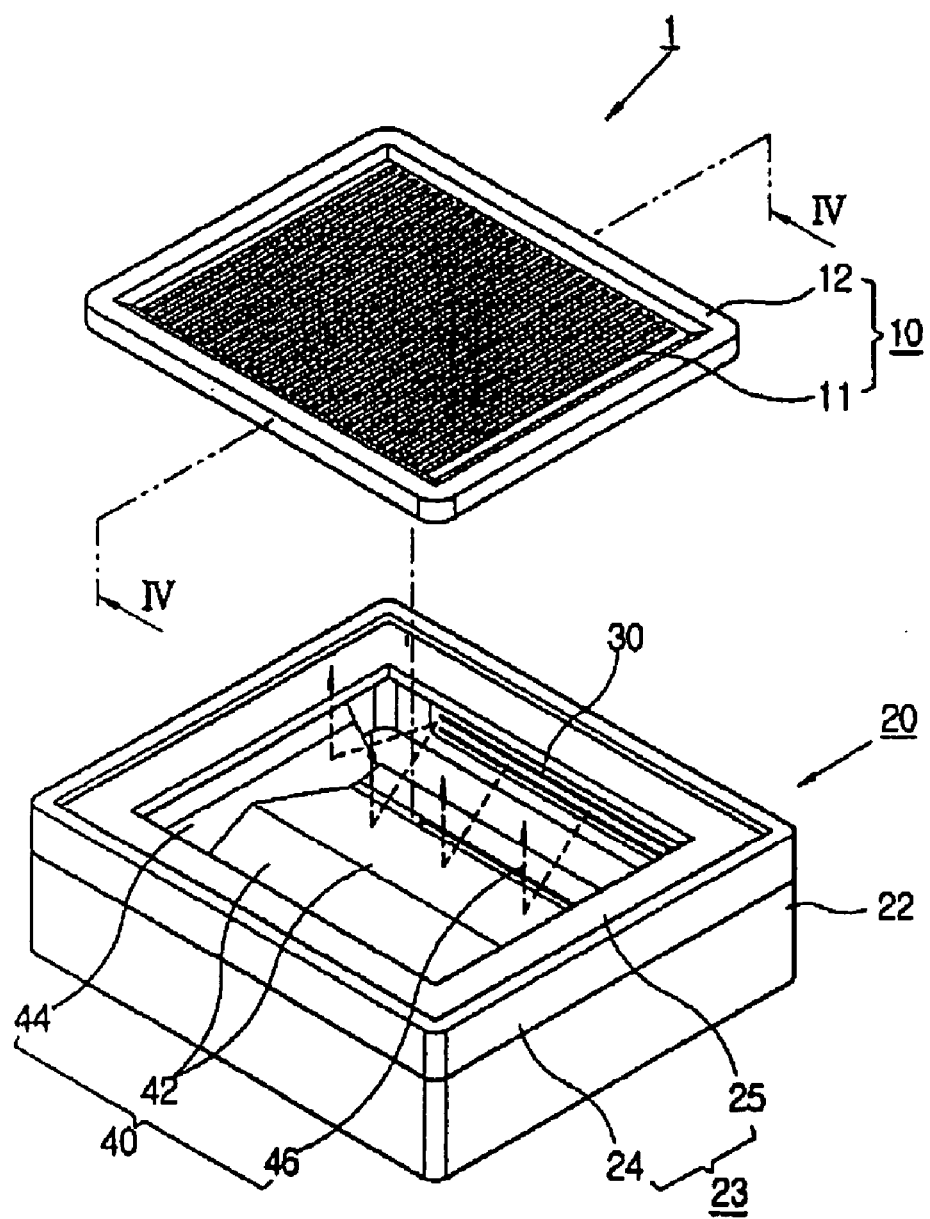
FIG. 2 is an exploded perspective view illustrating a grill part and a grill housing of the cooking apparatus according to an embodiment of the present invention.
Figure 4:
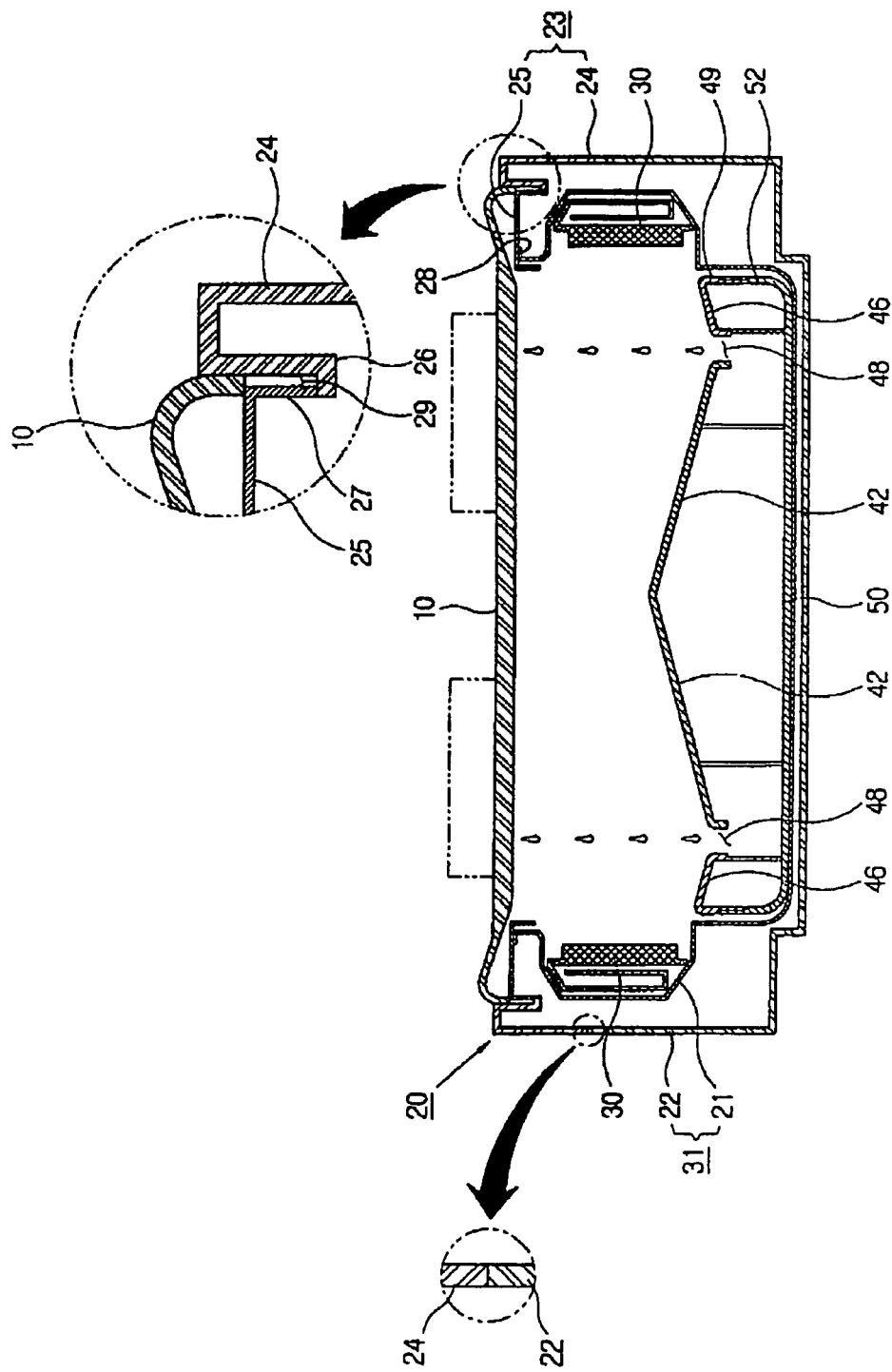
FIG. 4 is a sectional view of the cooking apparatus taken along line IV—IV of FIG. 2 to illustrate that the grill part and the grill housing assembled together.

As shown in FIGS. 2 and 4, the top casing 23 comprises a pair of a first top casing unit 24 and a second top casing unit 25 which can be separated and are disposed putting the space between them to prevent the top casing 23 from receiving of heat generated from the electric heaters 30 through the inner casing 21.

A first end part of the first top casing unit 24 is coupled with an upper area of the outer casing 22. A second end part of the first top casing unit 24 is provided with a first contact supporter 26 contacting and supporting the second top casing unit 25.

Figure 3:
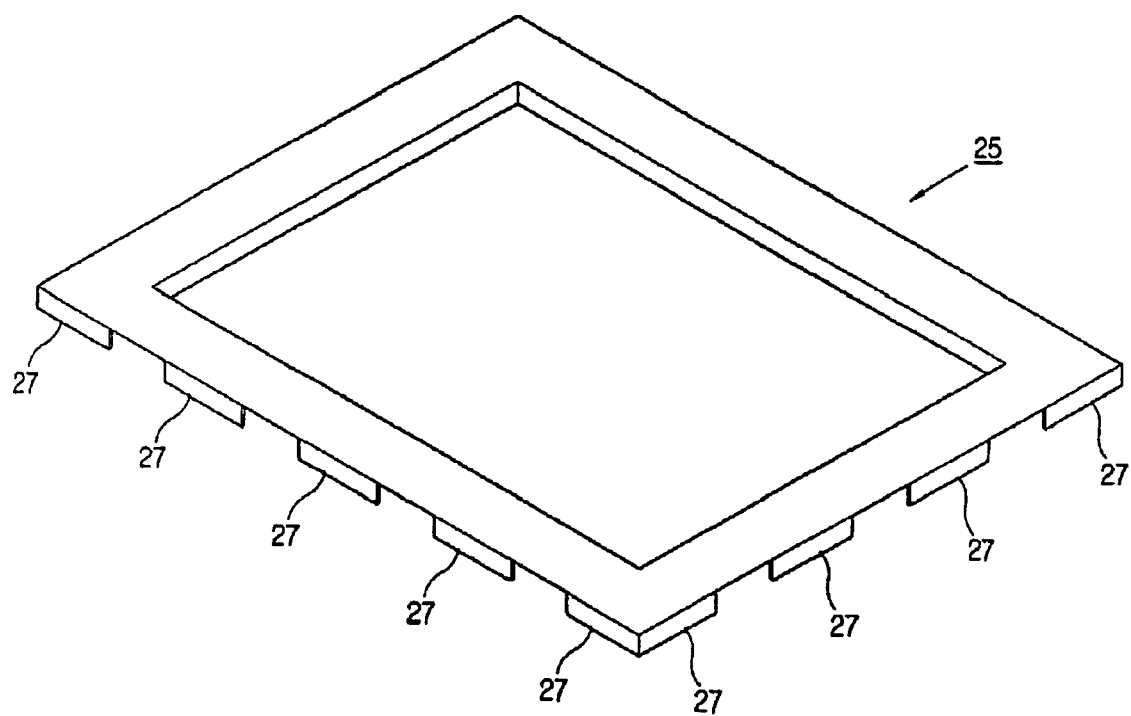
FIG. 3 is a perspective view of a second top casing unit illustrated in FIG. 2.

A first end part of the second top casing unit 25 is contacted and supported by a second contact supporter 28 formed bent in an upper end area of the inner casing 21. In FIG. 3, a second end part of the second top casing unit 25 is provided with a point contact part 27 by using a contact part being point contacted with the first contact supporter 26 of the first top casing unit 24. A plurality of point contact parts 27 are provided spaced along a circumferential direction of the opening part of the main casing 31.

Between the first top casing unit 24 and the second top casing unit 25 is provided an insulation space 29 having a predetermined distance therebetween.

Hereinbelow, an effectiveness of the top casing 23 having the first and second top casing units 24, 25 which can be separated each other and put the insulation space 29 therebetween will be described.

The grill reflection member 40 coupled with the oil collector 50 in a lower side thereof and the electric heaters 30 are accommodated inside the grill housing 20. The grill part 10 is disposed in the upper side of the grill housing 20. The heat generated from the electric heaters 30 is transmitted to the grill part 10 to be reflected in the grill reflection member 40. Therefore, food is cooked in the grill part 10, and the oil from the food being cooked falls down onto the grill reflection member 40. At this time, the oil falling down to the grill reflection member 40 is guided to the oil collector 50 disposed in the lower part of the grill reflection member 40 through the oil guiding hole 48.

During this cooking process, heat generated from the electric heaters 30 provided in the inner casing 21 of the grill housing 20 can move to the top casing 23 connected with the inner casing 21 through the inner casing 21.

At this time, because the top casing 23 is composed of the first and second top casing unit 24, 25 which can be separated, heat being transmitted from the inner casing 21 to the second top casing 25 cannot easily move to the first top casing unit 24, thereby preventing the top casing 23 from being heated by heat.

Further, the insulation space 29 forming an air layer is provided between the first top casing unit 24 and the second top casing unit 25, so that it is suppressed and the heat transmitted from the inner casing 21 to the second top casing 25 is not transmitted to the first top casing unit 24, thereby preventing the top casing 23 from being heated by heat.

The second top casing unit 25 receiving heat transmitted from the inner casing 21 is point contacted in the first top casing unit 24 by the point contact part 27 to minimize contacting with each other, so that heat transmitted from the second top casing unit 25 to the first top casing unit 24 can be interrupted more effectively, thereby preventing the top casing 23 from being heated by heat.

The present invention comprises the top casing 23 which is composed of the first and second top casing unit 24, 25 being capable of separating, but is not limited thereto. The top casing 23 may comprise a plurality of the top casing units.

Further, this embodiment of the present invention comprises the point contact part 27 being provided in the second top casing unit 25, but is not limited thereto. The point contact part 27 may be provided in the first top casing unit 25.

As described above, the present invention provides a cooking apparatus that can prevent a top casing from being heated by heat transmitted from an electric heater.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A cooking apparatus comprising:
a grill part to cook food thereon, an electric heater to cook the food, and a grill housing, the grill housing comprising:
a main casing having an opening part coupled with the grill part, the electric heater provided thereon, to which heat from the electric heater is directly transferred, and
a top casing coupled with an upper side circumferential area of the main casing with a center thereof to the opening part, wherein the top casing comprises a plurality of top casing units separately provided from each other and an end of each of the top casing units contacts with each other and each top casing unit separately contacts with the grill part such that a closed insulation space is formed between the grill part and the top casing units, in order to prevent heat from the main casing from being transferred to the top casing.

2. The cooking apparatus according to claim 1, wherein the main casing further comprises:
an inner casing providing electric heaters in an inner side thereof; and
an outer casing disposed such that a predetermined space exist between the outer casing and the inner casing; wherein the top casing is coupled with an upper side of the inner casing and the outer casing, to cover the predetermined space between the inner casing and the outer casing.

3. The cooking apparatus according to claim 2, wherein the top casing comprises:
a first top casing unit coupled with an upper area of the outer casing; and
a second top casing unit being capable of separating from the first top casing unit, coupled with an upper area of the inner casing.

4. The cooking apparatus according to claim 3, wherein the closed insulation space forms an air layer between the first top casing unit and the second top casing unit.

5. The cooking apparatus according to claim 4, wherein the closed insulation space is formed by a predetermined distance between the first top casing unit and the second top casing unit.

6. The cooking apparatus according to claim 3, the second top casing unit comprising a plurality of contact parts spaced along a circumferential direction of the opening part of the main casing, wherein the first top casing unit contacts with the second top casing unit by the plurality of contact parts.

7. The cooking apparatus according to claim 5, wherein the second top casing unit comprising a plurality of contact parts spaced along a circumferential direction of the opening part of the main casing, wherein the first top casing unit contacts with the second top casing unit by the plurality of contact parts.

8. A cooking apparatus comprising:
a grill unit to seat food thereon, to be cooked;
a heating member to cook the food; and
a grill housing comprising:
a main casing having an inner casing and an outer casing of a predetermined distance apart, the inner casing housing a heating member to cook the food seated on the grill unit, wherein heat fro the heating member is directly transferred to the main casing; and
a top casing connected with an upper portion of the main casing, the top casing comprising a first top casing connected with the outer casing of the main casing, and a second top casing connected with the inner casing of the main casing,
wherein the first top casing is separated from the second top casing and an end of each of the first top casing and the second top casing contacts with each other and each of the first and second top casings separately contact with the grill unit such that a closed insulation space is formed between the grill unit and the respective top casings, to prevent the first top casing from contacting with the heating member, such that heat from the main casing is prevented from being transferred to the first top casing.

9. The cooking apparatus of claim 8, wherein the heating member comprises a plurality of electric heaters installed oppositely to each other on sidewalls of the inner casing to cook the food seated on the grill unit.

10. The cooking apparatus of claim 9, wherein the inner casing comprises a grill reflecting member to reflect the heat generated by the electric heaters to cook the food.

11. The cooking apparatus of claim 10, wherein the grill reflecting member comprises reflection faces interconnected with each other to reflect heat generated by the electric heaters in a bent manner.

12. The cooking apparatus of claim 11, further comprising:
an oil collector positioned at a lower part of the inner casing to collect oil from the food being cooked; and
oil guiding holes at respective ends of the reflection faces, to guide the oil into the oil collector.

13. A cooking apparatus having a grill part to cook food thereon, and an electric heater to cook the food, comprising:
a main casing having an opening part coupled with the grill part, the electric heater provided thereon; and
a first top casing connected with an outer casing of the main casing and a second top casing connected with an inner casing of the main casing, wherein the second top casing unit comprises a plurality of contact parts spaced along a circumferential direction of the opening part of the main casing, wherein the first top casing unit contacts with the second top casing unit by the plurality of contact parts.

* * * * *

UNITED STATES PATENT AND TRADEMARK OFFICE
CERTIFICATE OF CORRECTION

PATENT NO. : 7,227,105 B2 Page 1 of 1
APPLICATION NO. : 11/189794
DATED : June 5, 2007
INVENTOR(S) : Seong-deog Jang et al.

It is certified that error appears in the above-identified patent and that said Letters Patent is hereby corrected as shown below:

Column 6, Line 7, before "heating" change "a" to --the--.

Column 6, Line 8, change "fro" to --from--.

Signed and Sealed this

Sixth Day of November, 2007

JON W. DUDAS
*Director of the United States Patent and Trademark Office*